Patented May 1, 1928.

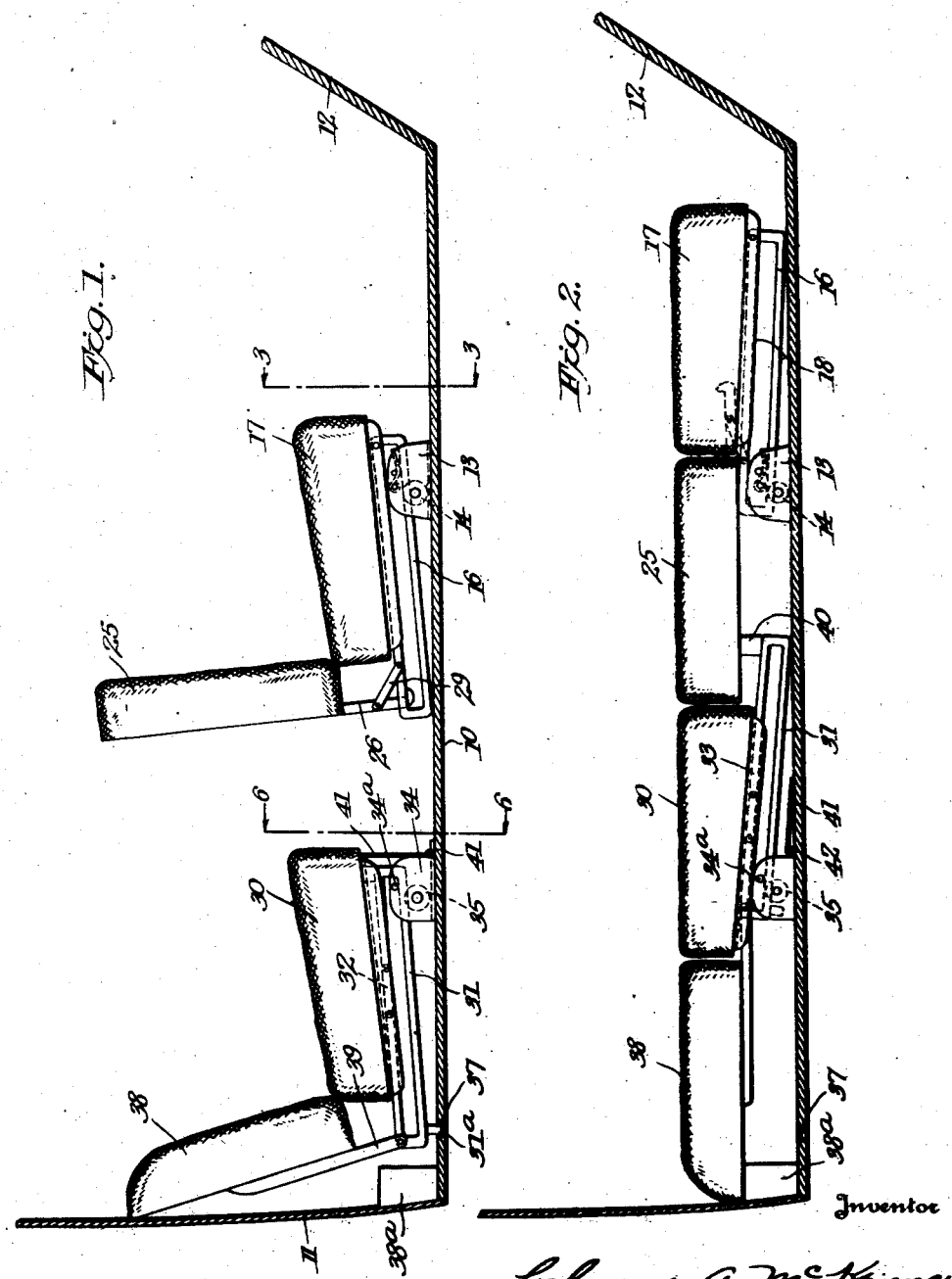

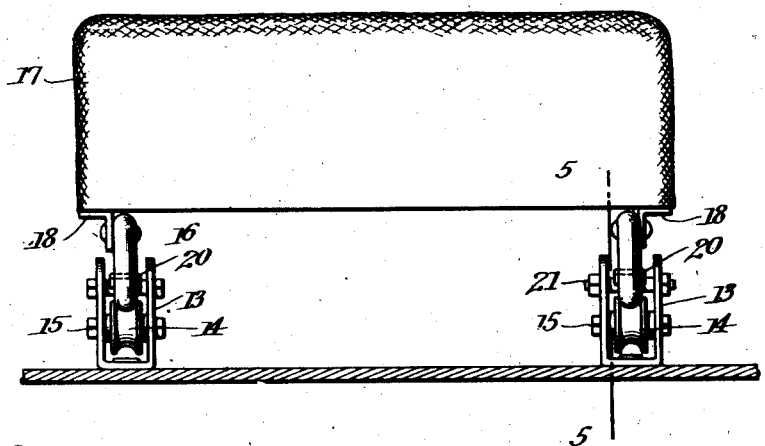
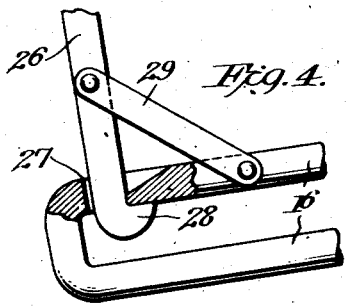
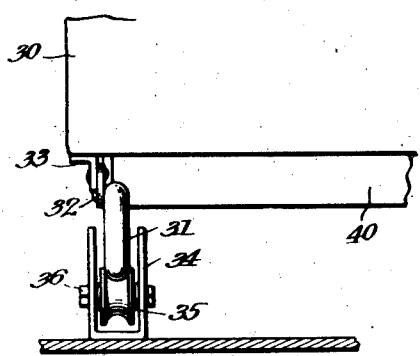
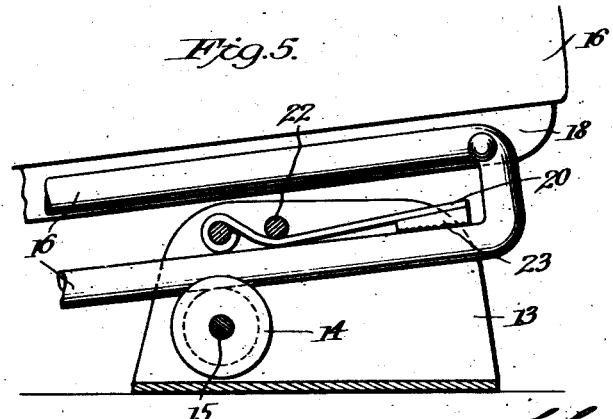

1,668,167

UNITED STATES PATENT OFFICE.

CLARENCE A. McKENNA, OF FLINT, MICHIGAN.

ADJUSTABLE DRIVING SEAT AND BED ARRANGEMENT FOR AUTOMOBILES.

Application filed December 13, 1926. Serial No. 154,396.

This invention relates to seats for automobiles and particularly to a construction for supporting the seats which permits the front seat to be adjusted for driving to suit persons of different heights and which also permits both seats to be readily arranged to form a bed so that the automobile can be used for sleeping purposes or as an ambulance or the like.

One object of the invention is to provide a front seat which can be quickly adjusted for driving purposes to any position desired and which will be automatically locked in its adjusted position.

A further object is to provide a back for the front seat which is so connected to the latter that the back can be turned down to a horizontal position and pressed against the rear edge of the front seat to form part of a bed, the front seat being adjusted to its extreme forward position at such time.

A still further object is to provide an arrangement of rear seat which can be moved forward into engagement with the back of the front seat when the latter is turned down to form a further part of the bed and in which the back of the rear seat may be turned down into horizontal position to complete the bed.

A still further object is to provide supporting means for the front and rear seats and the backs thereof which is so arranged that when the various parts are positioned to form a bed the upper surfaces of the seat cushions will form a substantially level bed surface.

A still further object is to arrange such supporting means so that the various parts of the front and rear seats may be easily and quickly arranged to form a bed.

Other objects and advantages of my improved arrangement will be apparent from the construction hereinafter described and shown in the accompanying drawings, which illustrate one specific embodiment of the invention, it being obvious that various modifications in details of structure may be made within the scope of the invention.

In said drawings:

Figure 1 shows a longitudinal section of an automobile body having my improved arrangement of seats applied thereto, the seats being shown in end elevation;

Figure 2 is a view similar to Fig. 1 showing the seats and the backs thereof turned down and the parts arranged so as to form a bed;

Figure 3 is a transverse section substantially on the line 3—3 of Fig. 1;

Figure 4 is a detailed view showing the means of connecting the back of the front seat to the supporting rails on which the front seat is mounted;

Figure 5 is a detailed view showing means employed for locking the seats, particularly the front seat, to prevent movement thereof; and Figure 6 is a partial transverse section substantially on the line 6—6 of Fig. 1 and showing the front of the rear seat and the means for supporting the same.

Referring to the drawings in detail by the reference characters thereon, the numeral 10 indicates the floor of an automobile body in which my improved construction is arranged. The numeral 11 indicates the back of the body and 12 the usual foot board at the front thereof. The arrangement used for supporting the front seat and the rear seat is the same to a considerable extent. This arrangement will first be described in reference to the front seat.

A pair of supports 13 is secured to the floor of the automobile body, one on each side thereof. These supports may be made in any suitable manner, but preferably comprise U-shaped plates having their intermediate portions secured to the floor and the arms thereof extending upwardly and spaced apart. A roller 14 is mounted in each of the supports 13 preferably by means of bolts 15 which pass through the upwardly extending arms of the supports. The rollers 14 are peripherally grooved and are adapted to support rails 16 which in turn are secured to the front seat 17. The seat 17 is, of course, provided with the usual cushions. The rails 16 are preferably slotted longitudinally. They may, of course, be made of a single plate or bar provided with a longitudinal slot, or if desired they may be formed by bending a rod into the form shown and securing the ends of the same together. The rails 16 may be secured to the under side of the seat in any desired manner. As illustrated these rails are riveted to angle bars 18 which in turn are rigidly secured to the seat frame. In the case of the front seat the rails are arranged to project to some extent beyond the rear vertical edge of the seat for reasons hereinafter pointed out.

It will be understood that the rails 16 are shaped to fit the grooved peripheries of the rollers 14 and it will also be apparent that with the parts arranged as described the rails 16 and the seat 17 carried thereby can be slid forwardly or rearwardly relative to the supports 13. In other words, the rails 16 are slidably and pivotally associated with the supports 13 so that the rails and the seat supported thereon may be adjusted to any position desired.

In order that the seat may be held in any desired position of adjustment, it is desirable to provide locking means between the rails 16 and the supports 13. The following means are designed for that purpose. Arranged in each of the supports 13 above the lower portion of the rails 16 is a flat yielding or spring locking member 20. The members 20 are mounted in the supports 13 by means of transverse bolts 21 which extend through eyes formed in the locking members 20. The locking members 20 intermediate their ends extend beneath bolts 22 which are also mounted in the supports 13. The forward or free ends of the locking members 20 are preferably provided with shoes 23 having roughened surfaces which are adapted to press against the lower portion of the rails 16 when the rear ends of the rails are depressed. It will be understood that when the rear ends of the rails are raised the locking members 20 will not act and the rails may then be pushed forward through the supports 13 to any extent desired. When the rails and the seat mounted thereon have been pushed forward to the desired degree and the rear ends of the rails are depressed or moved downwardly into contact with the floor, it will be understood that the locking members 20 come into contact with the lower portions of the rails 16 and the rails and the seat 17 are thus rigidly locked to the supports 13.

It will be seen that this construction provides a means by which the front seat 17 can be quickly adjusted to any desired position to suit persons of different heights. All that is necessary is to raise the rear ends of the rails and slide the seat to the point desired and upon depression of the same the locking members come into play to secure the seat in its adjusted position.

The back 25 of the front seat may if desired be rigidly secured to the seat itself but where the arrangement is to be employed as a bed it is, of course, necessary to connect the back of this seat in such manner that it can be turned down into horizontal position. To secure this result the back 25 of the front seat is provided with downwardly projecting arms 26 which are adapted to project through slots or openings 27 in the rearwardly projecting upper portion of the rails 16 and the lower ends of the arms 26 are provided with hooked portions 28 which are adapted to hook beneath a portion of the rail 16. Each of the arms 26 is also connected to the upper portion of the rail 16 by means of a link 29, each of these links being pivotally connected to the rail 16 and also to the corresponding arm 26.

The purpose of the construction just described will be briefly explained. By pushing the back 25 of the seat forwardly the lower ends 28 of the arms 26 may be unhooked from the rails 16. After this is done the back 25 may be turned down into a horizontal position and when thus turned down the links 29 will permit the back 25 to be pushed forwardly until the front edge thereof comes into engagement with the rear edge of the seat 17, it being understood that slots or openings are provided in the seat 17 to accommodate the arms 26 and the links 29 as shown particularly in Fig. 2 of the drawings. When thus turned down the front portion of the back 25 is supported on the rearwardly projecting portions of the rails 16.

When the front seat 17 is in its normal position for use in driving, it will be seen that the front ends of the rails 16 are supported somewhat above the floor of the body and that the rear ends of the rails rest against or near the floor. In other words, the rails rest in an inclined position. This serves to give the usual incline to the upper surface of the cushion of the seat 17. When the arrangement is to be used as a bed and the seat 17 is moved forwardly into the extreme forward position shown in Fig. 2, it will be seen that the front ends of the rails 16 rest upon the floor of the car and the parts are so proportioned that when the seat 17 is in this position the rails 16 will support the same so that the upper surface of the cushion on the seat 17 will be in a substantially horizontal position.

The rear seat 30 is supported in a manner similar to that of the front seat, but the construction differs somewhat in detail. Arranged beneath the seat 30 are two slotted rails 31 similar to the rails 16 already described. However, the rails 31 are not rigidly connected to the seat 30 as in the case of the front seat since it is desirable to have the rear seat 30 so arranged that the same can be moved rearwardly relative to the rails 31. To effect this result the seat 30 is secured to the rails 31 through the medium of links 32, one at each end of the seat 30. The links 32 are pivotally connected at one end to angle bars 33 rigidly secured to the seat 30 and at their other ends they are pivotally connected to an intermediate portion of the rails 31. This arrangement permits the seat 30 to be moved rearwardly relative to the rails 31.

The rails 31 are carried in supports 34 similar to the supports 13 and mounted on the floor of the automobile body and rollers 35 are provided in said supports 34 over which the rails 31 may travel. The rollers 35 are mounted on bolts 36 extending through the supports 34. Preferably bolts 34ª are provided which are mounted in the supports 34 and extend through the slots in the rails 31, thus holding the rails on the supports.

Adjacent their rear ends the rails 31 are provided with projections 31ª which are adapted to enter sockets 37 in the floor of the body, this arrangement serving to hold the rear seat 30 in its rearward position. It is, of course, obvious that if desired locking members similar to the members 20 above described may also be applied to hold the rails 31 locked to the supports 34.

The rear seat 30 is provided with a back 38 which is pivotally connected through arms 39 to the rear ends of the rails 31.

Normally the rear seat 30 and the back 38 thereof rest in the position shown in Fig. 1. When it is desired to convert the arrangement into a bed, the rails 31 are moved forward over the rollers 35 until the rails occupy the position shown in Fig. 2. The seat 30 is then pushed rearwardly which is permitted by means of the links 32 and the rear edge of the seat 30 is thus brought into contact with the front edge of the back 38 which can, of course, be turned down into the position shown in Fig. 2. When the back 38 is turned down into this position it may be supported by means of a ledge 38ª mounted in the rear of the body. When the rails 31 are moved forwardly to the position shown in Fig. 2, they will occupy an inclined position and this inclination is such that the upper surface of the cushion of the seat 30 will be brought into a substantially horizontal position.

Extending transversely across the body between the front ends of the rails 31 is a bar 40. This bar is rigidly secured to the rails 31 and normally rests beneath the front edge of seat 30 and is out of view. When the rails 31 are moved into the position shown in Fig. 2 and the seat 30 moved rearwardly, the bar 40 is uncovered and this bar is of such height that it will support the rear portion of the back 25 of the front seat in a substantially horizontal position.

If desired a plate 41 may be provided beneath the front edge of the rear seat 30 to conceal the mechanism beneath the seat. This plate is preferably hinged at 42 to the floor of the car and may be turned upwardly into the position shown in Fig. 1 or downwardly into the position shown in Fig. 2 so as not to interfere with the forward movement of the rails 31.

It will be seen that the foregoing construction provides a front seat which may be readily adjusted to any desired position to suit different drivers and which after being adjusted will be automatically locked in any position in which it is placed. It is apparent that the front seat may be either a single or a divided seat and in the latter case one or both portions of the same may be provided with the automatic locking means. It is further apparent that the foregoing construction is such that the seats and the backs thereof may be quickly positioned to provide a bed, the upper surface of which will be substantially level throughout its length, thus providing a comfortable cot or bed upon which a person may lie.

Having thus described the invention, what I claim as new and desire to secure by Letters Patent is:

1. In combination with an automobile body, a seat, two rails secured to said seat, one adjacent each end thereof, a stationary support for each rail mounted in said body, said rails being pivotally and slidably associated with said supports, and means for automatically locking said rails to said supports when the rear ends of the rails are depressed.

2. In combination with an automobile body, a seat, a pair of rails secured thereto, one adjacent each end of the seat, a support for each of said rails mounted in said body, said rails being slidable on said supports and the ends thereof being movable up and down relative to the supports, whereby said rails and the seat may be adjusted to any desired position, and means carried by said supports for automatically locking said rails to the supports when the rear ends of the rails are depressed.

3. In combination with an automobile body, a seat, a pair of rails secured to said seat, one on each end thereof, a support for each of said rails mounted on the floor of said body, said rails being slidably and pivotally associated with said supports, said rails normally resting in an inclined position with their front ends supported on said supports and their rear ends engaging said floor, means for locking said rails to said supports when the rails rest in their normal inclined position, said locking means being releasable by raising the rear ends of the rails, whereby the rails may be moved longitudinally relative to the supports.

4. In combination with an automobile body, a seat, a rail secured to each end of the seat, a support for each rail, said rails being slidably and pivotally associated with said supports, means for locking said rails to said supports when the rear ends of the rails are depressed, said locking means being inoperative when the rear ends of the rails are raised.

5. In combination with an automobile body, a front seat, a pair of stationary supports for said front seat, a pair of rails secured to said seat and slidable over said supports, whereby said seat may be moved forwardly or rearwardly as desired, a back for said front seat pivotally connected to said rails, said back being movable into a horizontal position at the rear of said front seat, a rear seat, a pair of stationary supports therefor, a pair of rails secured to said rear seat and slidable over said supports, whereby said rear seat may be moved forwardly, said rear seat being movable relative to said last named rails, means carried by said last named rails and extending transversely of the body to provide a support for the back of said front seat when the same is arranged horizontally, and a back pivotally connected to said last named rails and movable into a substantially horizontal position.

6. In combination with an automobile body, a bed and seat arrangement therefor comprising, a pair of front supports rigidly mounted in said body, a pair of front rails slidably associated with said supports, whereby said rails may be moved forwardly or rearwardly as desired, a front seat secured to said front rails, the rear ends of said front rails projecting beyond said seat, a back for said front seat hingedly secured to said front rails and movable downwardly into a horizontal position with the front end thereof supported by the projecting ends of said rails, a pair of rear supports mounted in said body of the automobile, a pair of rear rails slidably associated with said rear supports, whereby said rear rails may be moved forwardly or rearwardly as desired, a back seat movably connected to said rear rails, whereby said back seat may be moved rearwardly on said rails beyond the front ends of said rear rails when the latter are moved forwardly, means carried by said rear rails for supporting the rear end of the back of the front seat when the latter is turned down into horizontal position, a back for said rear seat hingedly connected to said rear rails and movable downwardly into a horizontal position when said rear rails are moved forwardly, said front and rear rails and seats being moved forwardly and said backs turned down when the arrangement is used as a bed and said front and rear rails and seats being moved rearwardly and said backs raised to an upright position when the arrangement is to be used as ordinary seats.

7. In combination with an automobile body, a bed and seat arrangement therein comprising four sections, the first section being formed of the front seat, a pair of front rails secured to said front seat, a pair of front supports upon which the rear ends of the front rails rest and which hold said rear ends above the floor of the body and the upper surface of the seat substantially horizontal, the second section being formed of the back of the front seat, said back being hingedly connected to the rear side of said front seat and movable into horizontal position with its lower end abutting the rear end of the first section, means on said rails for supporting the front end of said back when in horizontal position, the third section being formed by the rear seat, a pair of rear rails for supporting said rear seat, a pair of rear supports upon which the rear ends of said last named rails rest and which hold said rear ends above the floor of the body with the upper surface of said rear seat substantially horizontal, said rear seat being movable rearwardly on said rear rails to expose the front ends thereof, means carried by the front ends of said rear rails upon which the rear end of said second section rests when in horizontal position, the rear end of said second section abutting the front end of said rear seat after the same is moved rearwardly, the fourth section being formed of the back of said rear seat, said back being hingedly connected to said rear rails and movable into a horizontal position, with the front edge thereof abutting the rear end of said third section, said front rails and rear rails being slidably and pivotally associated with said supports whereby they may be moved rearwardly thereon to bring said first and third sections in position for use as seats and said backs being movable into an upright position to form backs for the seats.

8. In combination with an automobile body a front seat arrangement adapted to function as an ordinary seat or as part of a bed, said arrangement comprising a pair of supports mounted on the floor of the automobile, a pair of rails slidably and pivotally associated with said supports, said supports serving to hold either end of said rails above the floor of the automobile with the other end resting upon the floor, a seat secured to said rails, the rear ends of said rails projecting beyond said seat, a back for said seat including arms projecting downwardly from the lower edge thereof and provided with hooked portions adapted to engage said rearwardly projecting portions of said rails, a link connecting each of said arms to the corresponding rail, said hooked portions of said arms being detachable from said rails, whereby said back may be turned into horizontal position and the lower edge thereof moved against the rear edge of said seat, the rearwardly projecting ends of said rails serving to support said back when in such horizontal position.

In testimony whereof I hereunto affix my signature.

CLARENCE A. McKENNA.